United States Patent
Sengar et al.

(10) Patent No.: US 8,402,755 B2
(45) Date of Patent: Mar. 26, 2013

(54) GAS TURBINE COMBUSTOR EXHAUST GAS SPRAY COOLING FOR NOX CONTROL USING SELECTIVE CATALYTIC REDUCTIONS

(75) Inventors: Ajit Singh Sengar, Bangalore Karnataka (IN); Saravanan Venkataraman Nattanmai, Chennai Tamilnadu (IN)

(73) Assignee: General Electric Company, Schenectady, NY (US)

( * ) Notice: Subject to any disclaimer, the term of this patent is extended or adjusted under 35 U.S.C. 154(b) by 959 days.

(21) Appl. No.: 12/182,899

(22) Filed: Jul. 30, 2008

(65) Prior Publication Data

US 2010/0024379 A1      Feb. 4, 2010

(51) Int. Cl.
*F01N 3/2885*    (2006.01)
*F01D 25/30*     (2006.01)
*F02C 7/1435*    (2006.01)

(52) U.S. Cl. .................. 60/299; 60/39.5; 60/39.53
(58) Field of Classification Search ............... 423/239.1; 60/299, 775, 39.3, 39.53, 39.5, 39.182
See application file for complete search history.

(56) References Cited

U.S. PATENT DOCUMENTS

| | | | | |
|---|---|---|---|---|
| 4,131,432 A * | 12/1978 | Sato et al. | ..................... | 422/177 |
| 4,353,207 A | 10/1982 | Lee | | |
| 5,233,934 A * | 8/1993 | Krigmont et al. | ............. | 110/345 |
| 5,555,718 A * | 9/1996 | Anderson et al. | ............... | 60/783 |
| 5,555,849 A | 9/1996 | Wiechard et al. | | |
| 5,628,186 A * | 5/1997 | Schmelz | ......................... | 60/274 |
| 5,918,555 A * | 7/1999 | Winegar | ...................... | 110/345 |
| 6,074,619 A * | 6/2000 | Schoubye | ................... | 423/239.1 |
| 6,162,409 A * | 12/2000 | Skelley et al. | ............. | 423/239.1 |
| 6,315,969 B1 * | 11/2001 | Yoshida | ..................... | 423/239.1 |
| 6,578,354 B2 * | 6/2003 | Hatamiya et al. | .......... | 60/39.511 |
| 6,609,483 B1 | 8/2003 | Albrecht et al. | | |
| 6,737,032 B1 | 5/2004 | Aspalter et al. | | |
| 7,069,716 B1 | 7/2006 | Childers | | |
| 7,361,321 B2 * | 4/2008 | Rocha et al. | ................ | 423/239.1 |
| 7,498,009 B2 * | 3/2009 | Leach et al. | ................... | 423/235 |
| 7,718,153 B2 * | 5/2010 | Sobolevskiy et al. | ...... | 423/239.1 |
| 2002/0150525 A1 * | 10/2002 | Hopkins et al. | ............... | 423/235 |
| 2007/0009412 A1 * | 1/2007 | Rocha et al. | ............... | 423/239.1 |

* cited by examiner

*Primary Examiner* — William H Rodriguez
(74) *Attorney, Agent, or Firm* — Sutherland Asbill & Brennan LLP

(57) ABSTRACT

Systems for reducing nitrogen oxides in combustion exhaust gas include a selective catalytic reactor (SCR) assembly having a catalyst bed for receiving a flow of exhaust gas, an exhaust gas conduit for introducing exhaust gas to the SCR assembly, at least one nozzle for introducing cooling water into the exhaust gas before the exhaust gas exits the SCR assembly, and at least one reductant conduit for introducing at least one reductant into the exhaust gas to form a reductant/exhaust mixture before the exhaust gas exits the SCR assembly. Methods for reducing nitrogen oxides in combustion exhaust gas include introducing an exhaust gas into a SCR assembly, and introducing cooling water into the exhaust gas, reducing the temperature of the exhaust gas, and introducing at least one reductant into the exhaust gas to form a reductant/exhaust mixture before the exhaust gas exits the SCR assembly.

16 Claims, 2 Drawing Sheets

GAS TURBINE COMBUSTOR EXHAUST GAS SPRAY COOLING FOR NOX CONTROL USING SELECTIVE CATALYTIC REDUCTIONS

TECHNICAL FIELD

The present invention relates to the reduction of nitrogen oxides (NOx) in combustion exhaust gases and more particularly to the reduction of NOx in the exhaust gases of simple cycle gas turbines using Selective Catalytic Reductions (SCR) systems.

BACKGROUND OF THE INVENTION

In the operation of gas turbine combustors, nitrogenous compounds in both the fuel used and from atmospheric nitrogen fixation during combustion lead to the presence of NOx in the combustor exhaust gas (also called the flue gas). With regulations on NOx control becoming more stringent around the world, it is important for combustion turbines to minimize NOx emissions.

One solution for reducing NOx emissions is the SCR system, which adds a reductant, typically ammonia or urea, to the exhaust gas stream before passing it through a catalytic bed that selectively adsorbs nitrogen oxides and the reducing agent. The adsorbed components undergo a chemical reaction on the catalyst surface and the reaction products are desorbed. NOx reduction using ammonia typically occurs through the following stoichiometric reactions:

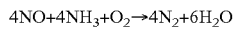
$$4NO+4NH_3+O_2 \rightarrow 4N_2+6H_2O$$

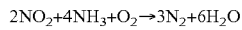
$$2NO_2+4NH_3+O_2 \rightarrow 3N_2+6H_2O$$

$$NO+NO_2+2NH_3 \rightarrow 2N_2+3H_2O$$

For a SCR system, the reactivity of the catalyst is dependent upon the flue gas temperature entering the catalyst reactor. The flue gas temperature at the exit of the gas turbine is typically above about 1200° F. while SCRs are generally designed to operate efficiently between about 600° F. to about 850° F. When the flue gas temperature at the exit of the gas turbine falls outside of the designed temperature range, the SCR catalytic conversion efficiency drops. Consequently, more ammonia or catalyst volume may be needed to maintain the conversion rate of the NOx, resulting in higher costs.

Two designs have been popular for cooling the exhaust gas to within the operating temperature range of the SCR. One such design cools the flue gas using a heat exchanger in the exhaust conduit, a representative example of which is described in U.S. Pat. No. 4,353,207. The heat exchanger reduces the temperature of the exhaust gas to within the reaction range by extracting heat, which is then used to produce steam for application elsewhere in the gas turbine. This type of arrangement is acceptable for combined cycle gas turbines used for base load operations, but is less applicable for simple cycle gas turbines typically used in peak load operations where space and cost are more restrictive.

Another design, applicable to both simple and combined cycle turbines, is to cool the exhaust gas by mixing it with ambient air. Using air-fans and injection openings, ambient air is blown into the exhaust gas conduit against the backpressure created by the exhaust gas flow. To reduce the temperature of the exhaust gas to within the reaction range, the quantity of air required is typically about 40-50% of the exhaust gas volume. The significant volume of coolant increases installation and operational costs while reducing turbine efficiency due to a greater pressure drop across the system. Poor mixing between the high-volume air and the exhaust gas can also cause a non-uniform temperature distribution across the catalyst bed, thus reducing overall catalytic activity. Additionally, the air flow rate may require wide-range adjustments to accommodate changing ambient conditions and exhaust gas temperatures, leading to significant operational variances.

Thus, there exists a need for a more efficient system for cooling the combustor exhaust gas to the temperature range suitable for NOx reduction in the SCRs.

BRIEF DESCRIPTION OF THE INVENTION

To solve the above-mentioned problems, embodiments encompassed by the present disclosure provide a system for reducing nitrogen oxides from a combustion exhaust gas, the system generally comprising a selective catalytic reactor (SCR) assembly comprising a catalyst bed for receiving a flow of a combustion exhaust gas, an exhaust gas conduit for injecting the exhaust gas to the SCR assembly, at least one nozzle for introducing cooling water into the combustion exhaust gas before the combustion exhaust gas exits the selective catalytic reactor assembly, and at least one reductant conduit for introducing at least one reductant into the combustion exhaust gas to form a reductant/exhaust mixture before the combustion exhaust gas exits the selective catalytic reactor assembly.

The present invention also encompasses a method for reducing nitrogen oxides in the exhaust gas stream, the method comprising introducing a combustion exhaust gas into a SCR assembly comprising a catalyst bed, introducing cooling water into the combustion exhaust gas before the combustion exhaust gas exits the selective catalytic reactor assembly, reducing the temperature of the combustion exhaust gas before the combustion exhaust gas exits the SCR assembly, and introducing at least one reductant into the combustion exhaust gas to form a reductant/exhaust mixture before the combustion exhaust gas exits the SCR assembly.

DETAILED DESCRIPTION OF THE INVENTION

As summarized above, embodiments of the present invention encompass a system and a method for reducing the amount of NOx present in a combustion exhaust gas. The system and method generally comprise lowering the temperature of the exhaust gas stream to within the operating temperature range of a SCR assembly by spraying cooling water into the combustion exhaust gas. While it is preferred that the NOx emissions be completely eliminated, any reduction in NOx emissions is contemplated as being within the scope of the present invention. Though embodiments of the present invention are particularly suitable for use in simple cycle gas turbines utilizing mid-range high temperature SCRs (HTSCRs) with an operating temperature from about 600° F. to about 850° F., they are not limited to these temperature ranges.

NOx Reduction System

Figure 1:
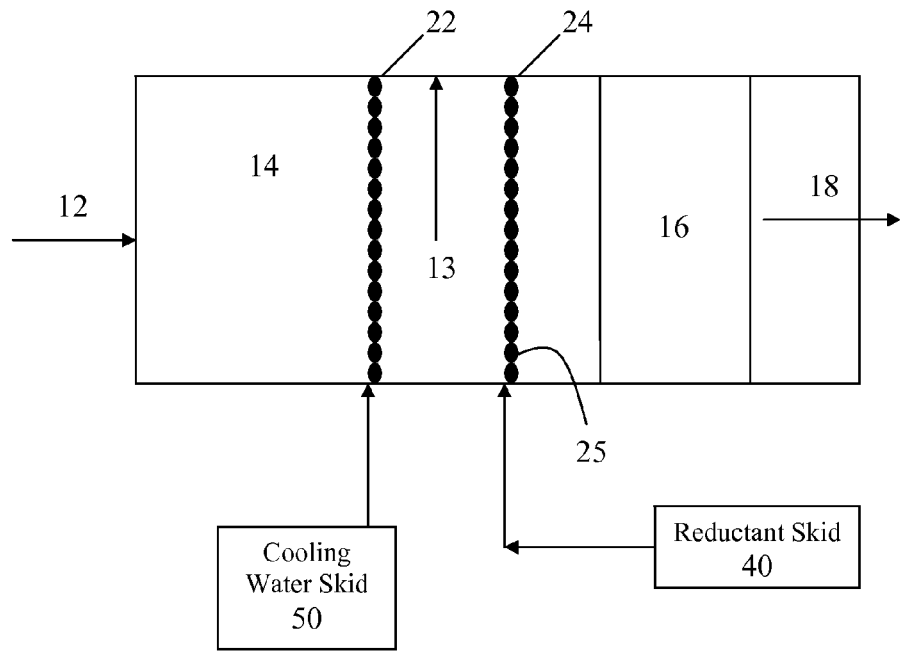
FIG. 1 is a schematic view of the NOx reduction system with separate nozzles for the cooling water and the reductant.

A particular embodiment of the present invention illustrated in FIG. 1 comprises a SCR assembly 16 comprising a catalyst bed (not shown) for receiving a flow of a combustion exhaust gas 12, an exhaust gas conduit 14 for introducing the combustion exhaust gas 12 to the SCR assembly 16, at least one nozzle or a plurality of nozzles arranged in a first array 22 for introducing cooling water into the combustion exhaust gas 12 before the combustion exhaust gas 12 exits the SCR assembly 16, and at least one reductant conduit or a plurality of reductant conduits arranged in a second array 24 for introducing at least one reductant into the combustion exhaust gas 12 to form a reductant/exhaust gas mixture before the combustion exhaust gas 12 exits the SCR assembly. The combustion exhaust gas exits the SCR assembly as a deNOxed gas 18. In a more particular embodiment, the nozzle or plurality of nozzles in the first array 22 are upstream of the SCR assembly 16 in the exhaust gas conduit 14. According to another embodiment, the at least one reductant conduit or plurality of reductant conduits in the second array 24 are upstream of the SCR assembly 16 in the exhaust gas conduit 14. In a more particular embodiment, the reductant conduit or plurality of reductant conduits in the second array 24 are downstream of the at least one nozzle in the exhaust gas conduit 14. In another embodiment, the reductant conduit comprises at least one injection pipe 25 for introducing the reductant into the combustion exhaust gas 12. The injection pipe 25 may be made entirely or partially from material permeable to the reductant or the injection pipe 25 may comprise a plurality of openings for the reductant to travel through.

Although embodiments of this invention may be useful to reduce NOx emissions from a variety of sources, the embodiment in FIG. 1 is particularly suitable for use with a gas turbine. Thus, the exhaust gas conduit 14 of the embodiment in FIG. 1 receives the combustion exhaust gas 12 from a combustion gas turbine (now shown). The present invention is particularly suited, although not limited to, for use with a simple cycle combustion gas turbine.

As shown in FIG. 1, one embodiment of the present invention further comprises a plurality of nozzles arranged in a first array 22 for introducing cooling water into the combustion exhaust gas 12 from a cooling water skid 50. In a particular embodiment, the reductant conduit may be connected to the at least one nozzle or the first array 22. In a more particular embodiment, the reductant and the cooling water are introduced into the combustion exhaust gas 12 substantially simultaneously. In another embodiment, as illustrated in FIG. 1, the reductant conduit or plurality of reductant conduits also comprise a plurality of nozzles arranged in a second array 24 for introducing the reductant into the combustion exhaust gas 12 from a reductant skid 40. The second array 24 may be placed downstream of the first array 22. In a more particular embodiment, the first array 22 and the second array 24 each covers the entire cross-section of the exhaust gas conduit 14.

The combustion exhaust gas 12 travels through the exhaust gas conduit 14 to the SCR assembly 16. The exhaust gas conduit 14 may comprise multiple sections with varying dimensions and shapes. Those of ordinary skill in the art are capable of designing an exhaust gas conduit 14 suitable for a particular NOx reduction system based on factors including, but limited to, quantities of exhaust gas, cooling water, and the reductant; the temperature and velocity of the exhaust gas stream; and cost and space constraints. According to a particular embodiment illustrated in FIG. 2, the reductant and the cooling water may be combined by a mixer 28 before being introduced to the combustion exhaust gas 12 using at least one combination array 26 that comprises the at least one nozzle or a plurality of nozzles. The first array 22 and/or the second array 24 and/or the combination array 26 may be placed in any suitable portion of the exhaust gas conduit 14 or arranged in different planes to cover the entire cross-section of the exhaust gas conduit 14. Those of ordinary skill in the art are capable of determining the optimal location for the array(s) based on factors which include, but are not limited to, velocities of the cooling water and the exhaust gas stream, the effective operating temperature range for the selected SCR assembly, and the dimensions of the exhaust gas conduit 14.

Figure 2:
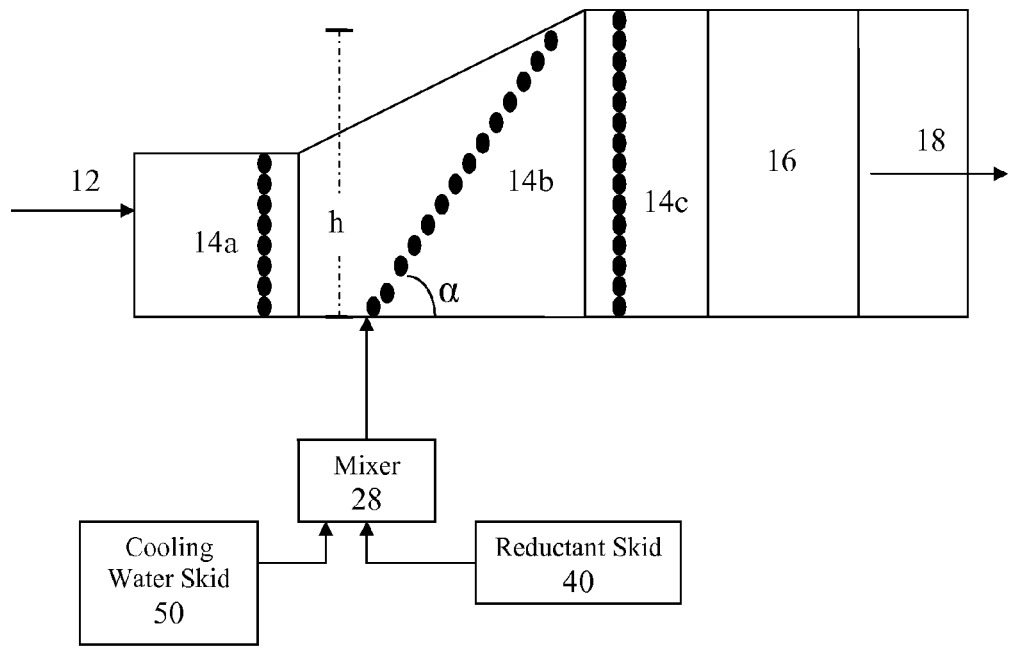
FIG. 2 is a schematic view of the NOx reduction system with a multi-section exhaust gas conduit and alternatives embodiments of nozzle positioning.

In one embodiment, as illustrated in FIG. 2, the exhaust gas conduit 14 comprises an inlet section 14a of a first diameter, a final section 14c of a second diameter that is larger than the first diameter, and a transitional section 14b of gradually increasing diameter connecting the inlet section 14a to the final section 14c. FIG. 2 shows multiple alternative embodiments of where the first array 22 or the second array 24 or the combination array 26 may be placed. In a particular embodiment, any of the arrays 22, 24, or 26 may be placed in the transitional section 14b at an angle a to cover the entire height of the transitional section 14b of the exhaust gas conduit 14. Without being bounded by any theory, it is believed that the array may help smooth the deceleration of the combustion exhaust gas 12 in the transitional section 14b, which in turn promotes a more uniform flow distribution upstream of the catalyst bed. The more uniform distribution and the extra distance for mixing and cooling the combustion exhaust gas 12 before it enters the catalyst bed helps to prolong the catalyst life. In another embodiment, any of the arrays 22, 24, or 26 may be placed in the inlet section 14a to minimize the number of nozzles required to cover the entire cross-section of the exhaust gas conduit 14. Placing an array further upstream in the exhaust gas conduit 14 either increases the distance for mixing and vaporization of the cooling water and/or the reductant before reaching the catalyst bed or allows the exhaust gas conduit 14 to be shortened and yet provide sufficient distance for mixing, cooling, and evaporation.

The first array 22 and/or the second array 24 and/or the combination array 26 may comprise any suitable number of nozzles and may be arranged in any suitable fashion. To fully utilize the entire catalyst bed, the combustion exhaust gas 12 has uniform temperature and reductant distribution in a radial direction 13 of the exhaust gas conduit 14. The radial direction 13 of the exhaust gas conduit 14 is perpendicular to the flow of the combustion exhaust gas 12 illustrated in FIG. 1. To promote uniformity, in a particular embodiment of the present invention, the plurality of nozzles of the first array 22 and/or the second array 24 are substantially evenly distributed in the exhaust gas conduit 14. "Substantially evenly distributed," as used herein, means that the nozzles are spaced substantially equidistant from one another along one or both axes of the first array 22 and/or second array 24.

In a particular embodiment, the first array 22 and/or the second array 24 and/or the combination array 26 may comprise from about 1 to about 500 nozzles, from about 10 to about 300 nozzles, or from about 50 to about 200 nozzles. In a more particular embodiment, the plurality of nozzles are pressure-atomized spray nozzles which are capable of introducing the cooling water and/or the reductant into the combustion exhaust gas 12 as particles having an average diameter of less than about 0.1 mm. Without being bounded by any theory, it is believed that smaller cooling water particles promote more uniform cooling and faster evaporation in the combustion exhaust gas 12. Those of ordinary skill in the art are capable of selecting or designing the proper nozzles based on factors including, but not limited to, pressure drop across the NOx reduction system, flow streamlining, and dimensions of the exhaust gas conduit.

Figure 3:
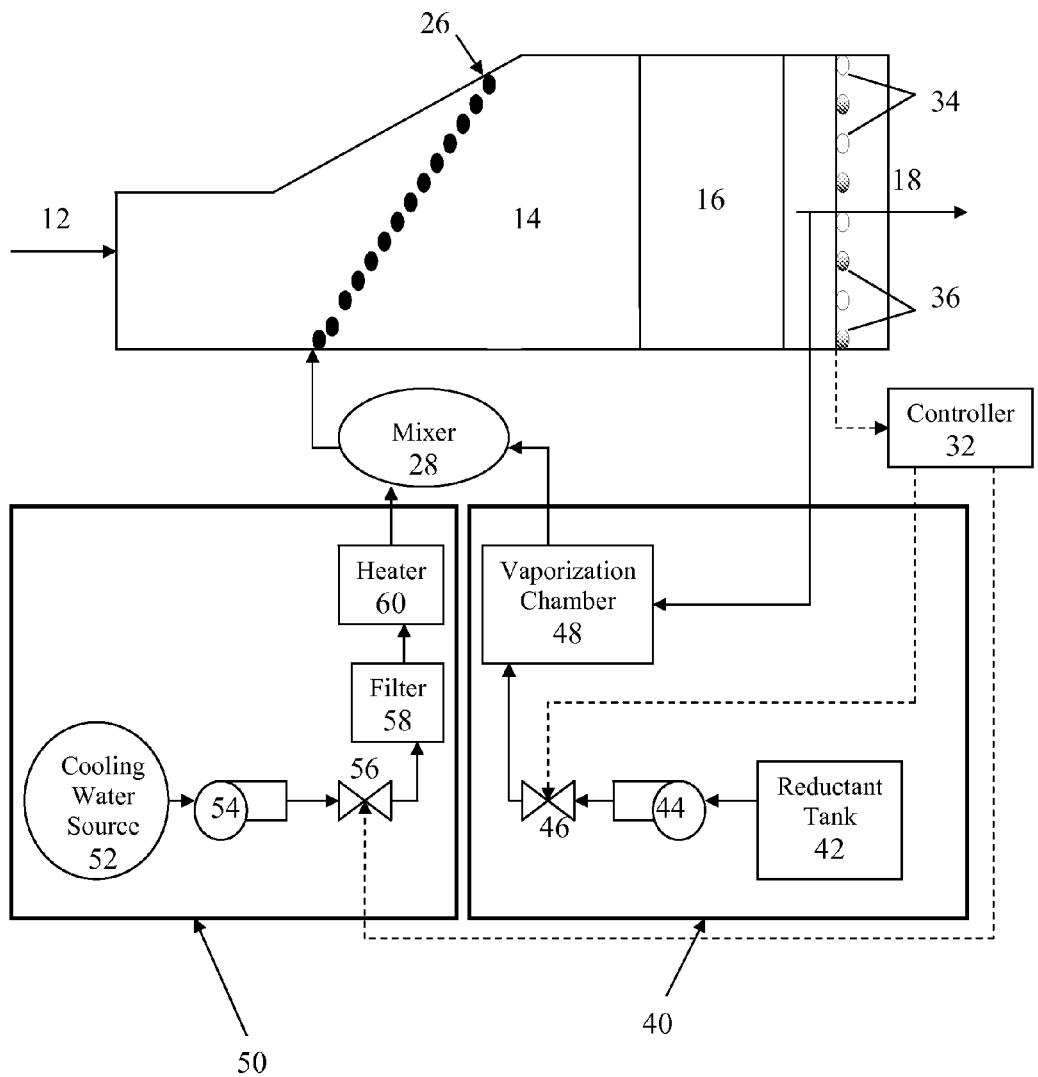
FIG. 3 is a schematic view of the NOx reduction system with a plurality of temperature and NOx sensors and a controller.

In another embodiment illustrated in FIG. 3, the reductant skid 40 comprises at least one of the following: a reductant tank 42, a reductant pump 44 for pumping reductant from the reductant tank, a reductant valve 46 to control the rate of the reductant flow, and a vaporization chamber 48 for partially or totally vaporizing the reductant. At least part of the deNOxed exhaust gas 18 may be recirculated to the vaporization chamber 48 to help heat the reductant. In yet another embodiment, also illustrated in FIG. 3, the cooling water skid 50 comprises at least one of the following: a cooling water source 52, a water pump 54 for pumping cooling water from the cooling water source, a water valve 56 to control the rate of the cooling water flow, a filter 58 for reducing the level of contaminants or minerals in the cooling water, and a heater 60 (or heat exchanger) to heat the cooling water.

The term "cooling water" is used herein to include liquid water and steam. The term "reductant" is used herein to mean any reducing agent for use in a SCR assembly to reduce pollutants from a gas turbine exhaust gas stream including, but not limited to, agents for reducing nitrogen dioxides and sulfur dioxides. According to a particular embodiment, the reductant comprises ammonia, urea, or combinations thereof. The reductant may be stored and/or introduced into the combustion exhaust gas 12 in vapor or liquid form.

In one embodiment, the heater or heat exchanger may be used to increase the temperature of the cooling water to at least about 60° F. before the cooling water is introduced into the combustion exhaust gas 12. In another embodiment, the cooling water is heated to at least about 250° F. before the cooling water is introduced into the combustion exhaust gas 12. Heating the cooling water will accelerate the vaporization of the water and/or the reductant droplets in the exhaust gas conduit 14. In a more particular embodiment, the heater may be placed directly in the exhaust gas conduit 14 to help streamline the combustion exhaust gas 12 upstream of the first array 22, second array 24, or the combination array 26. In another embodiment, the cooling water may be pressurized to a pressure of at least about 50 psi before being introduced into the combustion exhaust gas 12. In yet another embodiment, the cooling water and the reductant are introduced into the combustion exhaust gas 12 using the same pump.

The temperature of the combustion exhaust gas 12 entering the NOx reduction system may vary depending on the operating conditions of the gas turbine. In one embodiment, illustrated in FIG. 3, the system may further comprise at least one temperature sensor 34 to monitor the temperature of the deNOxed exhaust gas 18 near or downstream of the exit of the SCR assembly 16. The system may also comprise at least one NOx sensor 36 to monitor the NOx level of the deNOxed exhaust gas 18 near or downstream of the SCR assembly 16. In a more particular embodiment, a controller 32 may be used to receive the temperature and/or NOx level of the deNOxed exhaust gas 18 and to adjust the flow rate of the cooling water and/or the reductant in response to the monitored temperature and/or NOx level. In other embodiments, the temperature sensor 34 and/or the NOx sensor 36 may be placed near the entrance of the exhaust gas conduit 14. In still other embodiments, the temperature sensor 34 and/or the NOx sensor 36 may be placed upstream or near the entrance of the SCR assembly 16. The controller 32 may then control the rate of the reductant based on the stoichiometric level of the reductant required to react with the monitored NOx level in the combustion exhaust gas 12. Temperature and NOx sensors 34 and 36 may further be placed in the SCR assembly 16 to provide additional signals for adjusting the rates of the cooling water and the reductant being introduced to the combustion exhaust gas 12.

The efficiency of the catalytic reduction of NOx level in the combustion exhaust gas 12 depends on both the temperature and the reductant distributions of the reductant/exhaust mixture reacting on the catalyst bed. In one embodiment, the system further comprises a means for mixing the combustion exhaust gas 12 with the reductant and the cooling water in the exhaust gas conduit 14 to achieve a more uniform reductant and temperature distribution. Suitable means for mixing the combustion exhaust gas 12 with the reductant and the cooling water are well known to those of ordinary skill in the art. Examples of such mixing means include, but are not limited to, swirlers or vanes placed upstream or downstream of the at least one nozzle, reduced hydraulic passages, static mixers, turbulence generating grids, and perforated screens.

The specific heat value of liquid water is about four times that of air and the specific heat value of steam is about twice that of air. Accordingly, a smaller quantity of water is required to reduce the temperature of the combustion exhaust gas 12 as compared to the amount of air required to reduce the temperature by an equivalent amount. Furthermore, when the liquid water transforms into steam, the consumption of the heat of vaporization further cools the combustion exhaust gas 12. Thus, in a particular embodiment, the at least one nozzle may be located sufficiently upstream of the SCR assembly 16 in the exhaust gas conduit 14 for the cooling water to partially or completely evaporate before the reductant/exhaust mixture enters the catalyst bed. For example, in one embodiment, the distance between the at least one nozzle and the SCR assembly 16 is not less than about three feet and not more than about ten feet. In a particular embodiment, the cooling water completely evaporates in the nozzle before entering the exhaust gas conduit 14. In other embodiments, the nozzle may be insulated to prevent evaporation of the cooling water before the cooling water enters exhaust gas conduit 14. As described above, those of ordinary skill are capable of determining the optimal location for the at least one nozzle based on factors including, but not limited to, temperature of the cooling, length of the exhaust gas conduit, and distance between the nozzle and the SCR assembly.

Although it is contemplated herein that the cooling water and/or the reductant may be introduced into the exhaust gas at any point before the exhaust gas exits the SCR assembly 16, those of skill in the art should appreciate that generally the cooling water and/or the reductant should be introduced into the exhaust gas prior to entering the catalyst bed. In a particular embodiment, the at least one nozzle may be located sufficiently upstream of the SCR assembly 16 in the exhaust gas conduit 14 to provide a reductant/exhaust mixture having a substantially uniform temperature and/or reductant distribution in the radial direction 13 of the exhaust gas conduit 14 before the reductant/exhaust mixture enters the SCR assembly 16 and/or the catalyst bed.

In still other embodiments, the temperature of the combustion exhaust gas 12 may be reduced by combining other methods of cooling which are known to those of skill in the art. For example, in one embodiment the combustion exhaust gas 12 may be reduced by first cooling the combustion exhaust gas 12 with air and then with cooling water as provided in the embodiments described hereinabove.

NOx Reduction Method

This invention also encompasses a method for reducing nitrogen oxides in the combustion exhaust gas 12. The method generally comprises introducing the combustion exhaust gas 12 into a SCR assembly 16 comprising a catalyst bed, introducing cooling water into the combustion exhaust gas 12 before the combustion exhaust gas 12 exits the SCR assembly 16, reducing the temperature of the combustion exhaust gas 12 before the combustion exhaust gas 12 exits the SCR assembly 16, and introducing at least one reductant into the combustion exhaust gas 12 to form a reductant/exhaust mixture before the combustion exhaust gas 12 exits the SCR assembly 16. Unless otherwise specified, the steps recited in all method embodiments are not listed in any sequential order.

In a particular embodiment, the cooling water and the reductant may be introduced into the combustion exhaust gas 12 upstream of the SCR assembly 16. In a more particular embodiment, the cooling water and the reductant may be introduced into the combustion exhaust gas 12 substantially simultaneously. In still a more particular embodiment, the cooling water and the reductant may be introduced into the combustion exhaust gas 12 using the same nozzle or plurality of nozzles. In another embodiment, the cooling water may be introduced into the combustion exhaust gas 12 upstream of where the reductant is introduced into the combustion exhaust gas 12. In yet another embodiment, the reductant may be partially or totally vaporized before being introduced into the combustion exhaust gas 12. The vaporization may occur through external heating or by partially or totally recirculating the deNOxed exhaust gas 18 exiting the SCR assembly 16.

According to one particular embodiment of the present invention, the method further comprises monitoring the temperature of the combustion exhaust gas 12 upstream or downstream of the SCR assembly 16 and controlling the introduction of the cooling water into the combustion exhaust gas 12. In a more particular embodiment, the method further comprises calculating the amount of cooling water required to reduce the temperature of the combustion exhaust gas 12 before the combustion exhaust gas 12 exits the SCR assembly 16, and thereafter modifying the rate and/or amount of cooling water introduced into the combustion exhaust gas 12. In another embodiment, the method comprises selecting a preset temperature within the operating temperature range of the SCR assembly 16, monitoring the actual temperature of the reductant/exhaust mixture at or near the inlet of the SCR assembly 16, thereafter calculating the rate of cooling water required to reduce the temperature of the reductant/exhaust mixture to the preset SCR temperature from a difference between the preset SCR temperature and the actual temperature of the reductant/exhaust mixture, and thereafter modifying the rate of cooling water introduced into the combustion exhaust gas 12. In a more particular embodiment, the method comprises modifying the temperature of cooling water introduced into the combustion exhaust gas 12 in response to the difference between the preset SCR temperature and the actual temperature of the reductant/exhaust mixture. In still a more particular embodiment, the method comprises monitoring the temperature of the combustion exhaust gas 12 in the SCR assembly 16.

In another embodiment, the method further comprises monitoring the NOx level of the combustion exhaust gas 12 upstream or downstream of the SCR assembly 16 and controlling the introduction of the reductant into the combustion exhaust gas 12. In a more particular embodiment, the method further comprises calculating the amount of reductant required to reduce the NOx level of the combustion exhaust gas 12 before the combustion exhaust gas 12 exits the SCR assembly 16, and thereafter modifying the rate and/or amount of cooling water introduced into the combustion exhaust gas 12. In a more particular embodiment, the method comprises monitoring the NOx level in the SCR assembly 16.

As described above, although not wishing to be bound by any theory, it is believed that less cooling water is required to reduce the temperature of the combustion exhaust gas 12 by an equivalent amount when the cooling water vaporizes in the combustion exhaust gas 12. Accordingly, in one embodiment the method comprises introducing the cooling water into the combustion exhaust gas 12 through at least one nozzle sufficiently upstream of the SCR assembly 16 such that the cooling water partially or completely evaporates before the reductant/exhaust mixture enters the SCR assembly 16 or the catalyst bed.

According to a particular embodiment, the cooling water and/or the at least one reductant may be introduced into the combustion exhaust gas 12 sufficiently upstream of the SCR assembly 16 to provide a reductant/exhaust mixture of substantial uniformity in temperature and/or reductant distribution in the radial direction 13 of the exhaust gas conduit 14. In a more particular embodiment, the method comprises mixing the combustion exhaust gas 12 with the at least one reductant and the cooling water upstream of the SCR assembly 16 or the catalyst bed.

In still another embodiment the method further comprises heating the cooling water to at least about 60° F. and/or pressurizing the cooling water to at least about 50 psi before introducing the cooling water to the combustion exhaust gas 12. The method may further comprise filtering the cooling water before introducing the cooling water into the combustion exhaust gas 12.

The invention is further illustrated by the following example, which is not to be construed in any way as imposing limitations on the scope thereof. On the contrary, it is to be clearly understood that resort may be had to various other embodiments, modifications, and equivalents thereof which, after reading the description herein, may suggestion themselves to those skilled in the art without departing from the spirit of the present invention and/or scope of the appended claims.

EXAMPLE

Calculations from computational fluid dynamics modeling showed that about 450 lb/s of cooling air (about 59° F.) was required to cool a combustion exhaust gas with a flow rate of about 1,000 lb/s from 1200° F. to about 850° F. The cooling air increased the overall net flow by about 45%, which led to a pressure drop in the exhaust gas conduit by about 20 inches of wc. The air-fans working against this backpressure consumed about 2 MW of power.

When cooling water (about 59° F. and about 100 psi) was used, about 55 lb/s of water was required to cool the combustion exhaust gas with the same flow rate from about 1200° F. to about 850° F. The reduction in the flow rate, in turn, led to a pressure drop of only about 7 inches of wc. When water was used instead of air, about the power required to pump and inject the coolant into the combustion exhaust gas was about 50 times less. Pressurization effect created by injecting the high pressure cooling water using spray nozzles may further produce entrainment effect that reduces the gas turbine backpressure even more. The drops in power usage and backpressure are correlated with improved efficiency in the overall gas turbine system. Using cooling water also helps to reduce the dissociation risk of the reductant before reaching the catalyst bed. The significant reduction in the net flow allows the adaptation of the invention with minimal structural changes to the existing system. Additionally, the replacement of high-flow air-fans with low-flow water pumps is likely to reduce operational costs and increase system reliability. Other advantages, features, and embodiments would be apparent to those of ordinary skill in the art.

It should be understood that the foregoing relates to particular embodiments and that numerous changes may be made therein without departing from the scope of this disclosure as defined from the following claims.

The invention claimed is:

1. A system for reducing nitrogen oxides from a combustion exhaust gas comprising:
   a selective catalytic reduction assembly comprising a catalyst bed for receiving a flow of a combustion exhaust gas;
   an exhaust gas conduit for introducing the combustion exhaust gas to the selective catalytic reduction assembly, the exhaust gas conduit having a radial direction;
   at least one nozzle for introducing cooling water into the exhaust gas conduit to reduce the temperature of the combustion exhaust gas entering the catalyst bed, the at least one nozzle being upstream of the selective catalytic reduction assembly; and
   at least one reductant conduit for introducing at least one reductant for reducing nitrogen oxides into the exhaust gas conduit to form a reductant/exhaust mixture before the combustion exhaust gas exits the selective catalytic reduction assembly, the at least one reductant conduit being downstream of the at least one nozzle,
   wherein the at least one nozzle is located at a sufficient distance upstream of the selective catalytic reduction assembly to provide a substantially uniform temperature distribution in the radial direction before the reductant/exhaust mixture reaches the catalyst bed.

2. The system of claim 1, wherein the at least one reductant conduit comprises at least one injection pipe with a plurality of openings for introducing the at least one reductant into the exhaust gas conduit.

3. The system of claim 1, further comprising a plurality of nozzles including the at least one nozzle and arranged in a first array for introducing cooling water into the exhaust gas conduit.

4. The system of claim 3, wherein the reductant conduit comprises a plurality of nozzles arranged in a second array for introducing the at least one reductant into the exhaust gas conduit.

5. The system of claim 4, wherein the plurality of nozzles in the first array of nozzles and/or the plurality of nozzles in the second array of nozzles are substantially evenly distributed in the exhaust gas conduit.

6. The system of claim 1, wherein the at least one nozzle is located at a sufficient distance upstream of the selective catalytic reduction assembly in the exhaust gas conduit to allow for the cooling water to partially or completely evaporate before the reductant/exhaust gas mixture reaches the catalyst bed.

7. The system of claim 1, wherein the at least one nozzle comprises at least one combination nozzle for introducing a mixture of the cooling water and the at least one reductant into the exhaust gas conduit.

8. The system of claim 1, wherein the at least one reductant comprises ammonia, urea, or a combination thereof.

9. The system of claim 1, further comprising at least one sensor for monitoring the reductant/exhaust mixture temperature and a controller for controlling introduction of the cooling water into the exhaust gas conduit.

10. The system of claim 1, further comprising a heater for heating the cooling water to a temperature of at least about 60° F. before the cooling water is introduced into the exhaust gas conduit.

11. The system of claim 1 further comprising a gas turbine for producing the combustion exhaust gas.

12. The system of claim 1, wherein the at least one nozzle comprises a pressure-atomized nozzle capable of injecting particles having an average diameter of less than about 0.1 mm.

13. A method for reducing nitrogen oxides from a combustion exhaust gas stream, the method comprising:
   introducing a combustion exhaust gas into an exhaust gas conduit for introducing the combustion exhaust gas to a selective catalytic reduction assembly comprising a catalyst bed, the exhaust gas conduit having a radial direction;
   introducing cooling water into the exhaust gas conduit to reduce the temperature of the combustion exhaust gas entering the catalyst bed; and
   introducing at least one reductant for reducing nitrogen oxides into the exhaust gas conduit to form a reductant/exhaust mixture before the combustion exhaust gas exits the selective catalytic reduction assembly;
   wherein the cooling water is introduced into the exhaust gas conduit upstream of where the at least one reductant is introduced into the exhaust gas conduit and at a sufficient distance of the selective catalytic reduction assembly to provide a substantially uniform temperature distribution in the radial direction before the reductant/exhaust mixture reaches the catalyst bed.

14. The method of claim 13, wherein the step of introducing the combustion exhaust gas comprises introducing the combustion exhaust gas from a gas turbine.

15. The method of claim 13, further comprising:
   monitoring the combustion exhaust gas temperature upstream of the selective catalytic reduction assembly;
   calculating the amount of cooling water required to reduce the temperature of the combustion exhaust gas before the combustion exhaust gas exits the selective catalytic reduction assembly, and thereafter
   modifying the amount of cooling water introduced into the exhaust gas conduit.

16. The method of claim 13, further comprising:
   monitoring the nitrogen oxides level of the combustion exhaust gas downstream of the catalyst bed;
   calculating the amount of the at least one reductant required to reduce the nitrogen oxides level of the combustion exhaust gas before the combustion exhaust gas exits the catalyst bed, and thereafter
   modifying the amount of the at least one reductant introduced into the exhaust gas conduit.

* * * * *

UNITED STATES PATENT AND TRADEMARK OFFICE
CERTIFICATE OF CORRECTION

PATENT NO. : 8,402,755 B2  
APPLICATION NO. : 12/182899  
DATED : March 26, 2013  
INVENTOR(S) : Sengar et al.

Page 1 of 1

It is certified that error appears in the above-identified patent and that said Letters Patent is hereby corrected as shown below:

In the Claims:

In Column 10, line 34, after the word 'distance' insert --upstream--.

Signed and Sealed this  
Twenty-first Day of May, 2013

Teresa Stanek Rea  
*Acting Director of the United States Patent and Trademark Office*